US007780937B2

(12) United States Patent
Meyer et al.

(10) Patent No.: US 7,780,937 B2
(45) Date of Patent: Aug. 24, 2010

(54) GRANULES BASED ON PYROGENICALLY PREPARED SILICON DIOXIDE, METHOD FOR THEIR PREPARATION AND USE THEREOF

(75) Inventors: Jürgen Meyer, Stockstadt (DE); Monika Oswald, Hanau (DE); Klaus Deller, Hainburg (DE)

(73) Assignee: Evonik Degussa GmbH (DE)

( * ) Notice: Subject to any disclaimer, the term of this patent is extended or adjusted under 35 U.S.C. 154(b) by 287 days.

(21) Appl. No.: 11/885,742

(22) PCT Filed: Feb. 15, 2006

(86) PCT No.: PCT/EP2006/050946

§ 371 (c)(1),
(2), (4) Date: Oct. 16, 2007

(87) PCT Pub. No.: WO2006/094876

PCT Pub. Date: Sep. 14, 2006

(65) Prior Publication Data

US 2008/0213591 A1   Sep. 4, 2008

(30) Foreign Application Priority Data

Mar. 9, 2005   (EP)   ................... 05005093

(51) Int. Cl.
*B32B 5/16* (2006.01)
*C01B 33/12* (2006.01)

(52) U.S. Cl. .............. 423/335; 423/275; 427/452; 428/402; 428/403; 428/404; 428/405

(58) Field of Classification Search ................ 423/275, 423/335; 428/402, 403, 404, 405; 427/452
See application file for complete search history.

(56) References Cited

U.S. PATENT DOCUMENTS

| | | | |
|---|---|---|---|
| 2,938,772 A | 5/1960 | Eduard et al. | |
| 3,023,087 A | 2/1962 | Eduard et al. | |
| 3,024,089 A * | 3/1962 | Cosman et al. | 423/336 |
| 3,275,408 A | 9/1966 | Alexander | |
| 3,946,110 A * | 3/1976 | Hill | 514/161 |
| 4,624,800 A * | 11/1986 | Sasaki et al. | 516/81 |
| 4,681,615 A | 7/1987 | Toki et al. | |
| 4,940,588 A * | 7/1990 | Sparks et al. | 424/490 |
| 4,980,487 A * | 12/1990 | Thies et al. | 549/396 |
| 5,037,625 A | 8/1991 | Loritsch et al. | |
| 5,191,114 A * | 3/1993 | Chen | 562/496 |
| 5,230,833 A * | 7/1993 | Romberger et al. | 252/363.5 |
| 5,236,483 A | 8/1993 | Miyashita et al. | |
| 5,526,984 A | 6/1996 | Foster et al. | |
| 5,591,797 A * | 1/1997 | Barthel et al. | 524/493 |
| 5,643,347 A * | 7/1997 | Werdecker et al. | 65/21.1 |
| 5,776,240 A * | 7/1998 | Deller et al. | 106/482 |
| 5,922,298 A * | 7/1999 | Boyer et al. | 423/335 |
| 5,929,156 A * | 7/1999 | Fultz et al. | 524/492 |
| 5,969,180 A | 10/1999 | Willems et al. | |
| 6,007,883 A | 12/1999 | Foster et al. | |
| 6,663,963 B2 * | 12/2003 | Preston et al. | 428/402 |
| 6,679,945 B2 * | 1/2004 | Oswald et al. | 106/482 |
| 6,808,768 B2 * | 10/2004 | Satou et al. | 428/32.25 |
| 7,041,623 B2 * | 5/2006 | Kirkland et al. | 502/439 |
| 7,402,293 B2 * | 7/2008 | Meyer et al. | 423/335 |
| 7,608,234 B2 * | 10/2009 | Stenzel et al. | 423/335 |
| 2003/0108580 A1 * | 6/2003 | Hasenzahl et al. | 424/401 |
| 2004/0022844 A1 * | 2/2004 | Hasenzahl et al. | 424/452 |
| 2005/0103231 A1 * | 5/2005 | Geisselmann et al. | 106/482 |
| 2007/0003770 A1 * | 1/2007 | Jacobsen et al. | 428/428 |

FOREIGN PATENT DOCUMENTS

EP   0360659 A   3/1990

(Continued)

OTHER PUBLICATIONS

International Search Report dated May 10, 2006 issued in PCT/EP2006/050946.

(Continued)

*Primary Examiner*—H. (Holly) T Le
(74) *Attorney, Agent, or Firm*—Smith, Gambrell & Russell, LLP

(57) ABSTRACT

Granules based on silicon dioxide and having the properties:

| | |
|---|---|
| Average grain size: | 10 to 120 μm |
| BET surface area: | 40 to 400 m²/g |
| Pore volume: | 0.5 to 2.5 ml/g |
| Pore size distribution: | less than 5% of the total pore volume exists of pores with a diameter < 5 nm, rest meso- and macropores |
| pH value: | 3.6 to 8.5 |
| Tapped density: | 220 to 700 g/l |

They are prepared by dispersing silicon dioxide in water, spray drying, optionally heating and/or silanizing.

Whereas a pyrogenic silicon dioxide powder with a BET surface area of 30 to 90 m$^2$/g, a DBP index of 80 or less, a mean aggregate area of less than 25000 nm$^2$ and a mean aggregate circumference of less than 1000 nm, wherein at least 70% of the aggregates have a circumference of less than 1300 nm or a high-purity pyrogenically prepared silicon dioxide having metal contents of less than 0.2 μg/g is prepared by reacting a silicon tetrachloride having a metal content of less than 30 ppb by means of flame hydrolysis is used.

5 Claims, No Drawings

FOREIGN PATENT DOCUMENTS

| | | |
|---|---|---|
| EP | 0 586 013 A2 | 3/1994 |
| EP | 0 586 013 A3 | 3/1994 |
| EP | 0976457 A | 2/2000 |
| EP | 1 348 669 A | 10/2003 |
| FR | 1 382 482 A | 12/1964 |
| JP | 61 168541 A | 7/1986 |
| JP | 62 226821 A | 10/1987 |
| WO | WO-A-0153225 | 7/2001 |
| WO | 03078321 A1 | 9/2003 |
| WO | 2004054929 A1 | 7/2004 |
| WO | WO 2006/094876 A3 | 9/2006 |

OTHER PUBLICATIONS

International Search Report issued in PCT/US 01/02325 dated May 22, 2001.

* cited by examiner

GRANULES BASED ON PYROGENICALLY PREPARED SILICON DIOXIDE, METHOD FOR THEIR PREPARATION AND USE THEREOF

BACKGROUND OF THE INVENTION

1. Field of the Invention

The invention relates to granules based on pyrogenically prepared silicon dioxide, the method for their preparation and the use thereof as catalyst supports and for glass applications.

2. Description of Background Art

The preparation of pyrogenic silicas or silicon dioxides from SiCl4 by means of high-temperature-or flame hydrolysis is known (Ullmanns Enzyklopädie der technischen Chemie, 4th Edition, Volume 21, page 464 (1982)).

Pyrogenic silicon dioxides are distinguished by having extremely fine particles, high specific surface (BET), very high purity, spherical particle shape and the absence of pores. On account of these properties pyrogenically prepared silicon dioxides are attracting increasing interest as supports for catalysts (Dr. Koth et al., Chem. Ing. Techn. 52, 628 (1980)). For this application the pyrogenically prepared silicon dioxide is shaped by mechanical means, for example, tabletting machines.

The shaping of pyrogenically prepared silicon dioxide into sprayed granules also by means of spray drying, to obtain a starting material for sintered ceramic materials, is also known (DE-A 36 11 449).

It is also known that silicon dioxide pyrogenically prepared in an electric arc may be shaped by means of spray drying into sprayed granules, which can be used as adsorption media or else as catalyst supports (DE-A 12 09 108).

The subjection of pyrogenically prepared silicon dioxide to a gel process and the subsequent shaping into granules by means of spray drying is also known. These granules, after coating with chromium oxide, are used in the polymerisation of ethylene (EP-A 0 050 902, U.S. Pat. No. 4,386,016).

Furthermore, the use of precipitated silicon dioxide as a catalyst support for the catalytic polymerisation of olefins is known (WO 91/09881).

The known sprayed granules of pyrogenically prepared silicon dioxides have the disadvantage that they are not optimally suitable for use as catalyst supports, for example, in the production of polyethylene.

SUMMARY OF THE INVENTION

The object was therefore the development from pyrogenically prepared silicon dioxide of sprayed granules which can be used as catalyst supports in the production of polyethylene.

The present invention provides granules based on pyrogenically prepared silicon dioxide and having the following physicochemical properties:

| | |
|---|---|
| Average grain size: | 10 to 120 μm |
| BET surface area: | 40 to 400 m$^2$/g |
| Pore volume: | 0.5 to 2.5 ml/g |
| Pore size distribution: | less than 5% of the total pore volume exists of pores with a diameter < 5 nm, rest meso- and macropores |
| pH value: | 3.6 to 8.5 |
| Tapped density: | 220 to 700 g/l |

The granular material according to the invention can be prepared by dispersing pyrogenically prepared silicon dioxide in water, spray drying it and heating the granules obtained at a temperature of from 150 to 1,100° C. for a period of 1 to 8 h.

The invention also provides granules based on pyrogenically prepared silicon dioxide and having the following physicochemical properties:

| | |
|---|---|
| Average grain size: | 10 to 120 μm |
| BET surface area: | 40 to 400 m$^2$/g |
| Pore volume: | 0.5 to 2.5 ml/g |
| Pore size distribution: | less than 5% of the total pore volume exists of pores with a diameter < 5 nm, rest meso- and macropores |
| pH value: | 3.6 to 8.5 |
| Tapped density: | 220 to 700 g/l |

The granular material according to the invention can be prepared by dispersing pyrogenically prepared silicon dioxide in water, spray drying it and silanising the granules obtained. Halosilanes, alkoxysilanes, silazanes and/or siloxanes can be used for the silanisation.

The following substances in particular can be used as halosilanes:

a) Organosilanes of the types $(RO)_3Si(C_nH_{2n+1})$ and $(RO)_3Si(C_nH_{2n-1})$
  R=Alkyl, as for example Methyl-, Ethyl-, n-Propyl-, i-Propyl-, Butyl-
  n=1-20 b) Organosilanes of the types $R'_x(RO)_ySi(C_nH_{2n+1})$ and $R'_x(RO)ySi(C_nH_{2n-1})$
  R=Alkyl, as for example Methyl-, Ethyl-, n-Propyl-, i-Propyl-, Butyl-
  R'=Alkyl, as for example Methyl-, Ethyl-,
  n-Propyl-, i-Propyl-, Butyl-
  R'=Cycloalkyl
  n=1-20
  x+y=3
  x=1,2
  y=1,2 c) Halogenorganosilanes of the types $X_3Si(C_nH_{2n+1})$ and $X_3Si(C_nH_{2n-1})$
  X=Cl, Br
  n=1-20 d) Halogenorganosilanes of the types $X_2(R')Si(C_nH_{2n+1})$ and $X_2(R')Si(C_nH_{2n-1})$
  X=Cl, Br
  R'=Alkyl, as for example Methyl-, Ethyl-, n-Propyl-, i-Propyl-, Butyl-
  R'=Cycloalkyl
  n=1-20 e) Halogenorganosilanes of the types $X(R')_2Si(C_nH_{2n+1})$ and $X(R')_2Si(C_nH_{2n-1})$
  X=Cl, Br
  R'=Alkyl, as for example Methyl-, Ethyl-, n-Propyl-, i-Propyl-, Butyl-
  R'=Cycloalkyl
  n=1-20 f) Organosilanes of the types $(RO)_3Si(CH_2)_m$—R'
  R=Alkyl, as Methyl-, Ethyl-, Propyl-
  m=0,1-20
  R'=Methyl-, Aryl (as for example —$C_6H_5$, substituted phenyl groups)

—$C_4F_9$, $OCF_2$—CHF—$CF_3$, —$C_6F_{13}$, —O—$CF_2$—$CHF_2$
—$NH_2$, —$N_3$, —SCN, —CH=$CH_2$, —NH—$CH_2$—$CH_2$—$NH_2$,
—N—($CH_2$—$CH_2$—$NH_2$)$_2$
—$OOC(CH_3)C$=$CH_2$
—$OCH_2$—CH(O)$CH_2$
—NH—CO—N—CO—($CH_2$)$_5$
—NH—COO—$CH_3$, —NH—COO—$CH_2$—$CH_3$,
—NH—($CH_2$)$_3$Si (OR)$_3$
—$S_x$—($CH_2$)$_3$Si (OR)$_3$
—SH
—NR'R"R''' (R'=Alkyl, Aryl; R"=H, Alkyl, Aryl; R'''=H, Alkyl, Aryl, Benzyl, $C_2H_4$NR"" mit R""=H, Alkyl und R""'=H, Alkyl)

g) Organosilanes of the types (R")$_x$(RO)$_y$Si($CH_2$)$_m$—R'

R" = Alkyl
  = Cycloalkyl $x + y = 3$
$x = 1, 2$
$y = 1, 2$
$m = 0, 1$ bis $20$

R'=Methyl-, Aryl (as for example —$C_6H_5$, substituted phenyl groups)
—$C_4F_9$, —$OCF_2$—CHF—$CF_3$, —$C_6F_{13}$, —O—$CF_2$—$CHF_2$
—$NH_2$, —$N_3$, —SCN, —CH=$CH_2$, —NH—$CH_2$—$CH_2$—$NH_2$,
—N—($CH_2$—$CH_2$—$NH_2$)$_2$
—$OOC(CH_3)C$=$CH_2$
—$OCH_2$—CH(O)$CH_2$
—NH—CO—N—CO—($CH_2$)$_5$
—NH—COO—$CH_3$, —NH—COO—$CH_2$—$CH_3$,
—NH—($CH_2$)$_3$Si(OR)$_3$
—$S_x$—($CH_2$)$_3$Si(OR)$_3$
—SH
—NR'R"R''' (R'=Alkyl, Aryl; R"=H, Alkyl, Aryl; R'''=H, Alkyl, Aryl, Benzyl, $C_2H_4$NR"" R""" with R""=H, Alkyl and R""'=H, Alkyl)

h) Halogenorganosilanes of the types $X_3$Si($CH_2$)$_m$—R'
X=Cl, Br
m=0,1-20
R'=Methyl-, Aryl (for example —$C_6H_5$, substituted Phenyl groups)
—$C_4F_9$, —$OCF_2$—CHF—$CF_3$, —$C_6F_{13}$, —O—$CF_2$—$CHF_2$
—$NH_2$, —$N_3$, —SCN, —CH=$CH_2$,
—NH—$CH_2$—$CH_2$—$NH_2$
—N—($CH_2$—$CH_2$—$NH_2$)$_2$
—$OOC(CH_3)C$=$CH_2$
—$OCH_2$—CH(O)$CH_2$
—NH—CO—N—CO—($CH_2$)$_5$
—NH—COO—$CH_3$, —NH—COO—$CH_2$—$CH_3$,
—NH—($CH_2$)$_3$Si(OR)$_3$
—$S_x$—($CH_2$)$_3$Si(OR)$_3$
—SH i) Halogenorganosilanes of the types (R)$X_2$Si($CH_2$)$_m$—R'
X=Cl, Br
R=Alkyl, as Methyl,- Ethyl-, Propyl-
m=0,1-20
R'=Methyl-, Aryl (z.B. —$C_6H_5$, substituted Phenyl groups)
—$C_4F_9$, —$OCF_2$—CHF—$CF_3$, —$C_6F_{13}$, —O—$CF_2$—$CHF_2$
—$NH_2$, —$N_3$, —SCN, —CH=$CH_2$, —NH—$CH_2$—$CH_2$—$NH_2$,
—N—($CH_2$—$CH_2$—$NH_2$)$_2$
—$OOC(CH_3)C$=$CH_2$
—$OCH_2$—CH(O)$CH_2$
—NH—CO—N—CO—($CH_2$)$_5$
—NH—COO—$CH_3$, —NH—COO—$CH_2$—$CH_3$,
—NH—($CH_2$)$_3$Si(OR)$_3$, whereby R may be Methyl-, Ethyl-, Propyl-, Butyl-
$S_x$—($CH_2$)$_3$Si(OR)$_3$, whereby R may be Methyl-, Ethyl-, Propyl-, Butyl-
—SH j) Halogenorganosilanes of the types (R)$_2$X Si($CH_2$)$_m$—R'
X=Cl, Br
R=Alkyl
m=0,1-20
R'=Methyl-, Aryl (z.B. —$C_6H_5$, substituted Phenyl groups)
—$C_4F_9$, —$OCF_2$—CHF—$CF_3$, —$C_6F_{13}$, —O—$CF_2$—$CHF_2$
—$NH_2$, —$N_3$, —SCN, —CH=$CH_2$, —NH—$CH_2$—$CH_2$—$NH_2$,
—N—($CH_2$—$CH_2$—$NH_2$)$_2$
—$OOC(CH_3)C$=$CH_2$
—$OCH_2$—CH(O)$CH_2$
—NH—CO—N—CO—($CH_2$)$_5$
—NH—COO—$CH_3$, —NH—COO—$CH_2$—$CH_3$,
—NH—($CH_2$)$_3$Si(OR)$_3$
—$S_x$—($CH_2$)$_3$Si(OR)$_3$
—SH k) Silazane of the type

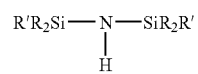

R=Alkyl, Vinyl, Aryl
R'=Alkyl, Vinyl, Aryl l) Cyclic polysiloxanes of the types D 3, D 4, D 5, whereby D 3, D 4 and D 5 cyclic may be polysiloxanes with 3,4 or 5 units of the types —O—Si($CH_3$)$_2$— i.e. octamethylcyclotetrasiloxane=D 4

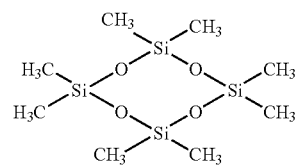

m) Polysiloxanes respectively silicon oil of the type

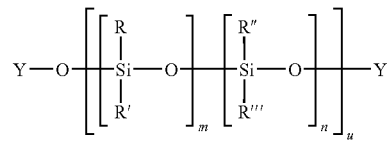

-continued m = 0, 1, 2, 3, ... ∞
n = 0, 1, 2, 3, ... ∞
u = 0, 1, 2, 3, ... ∞
Y = $CH_3$, H, $C_nH_{2n+1}$ n = 1-20
Y = $Si(CH_3)_3$, $Si(CH_3)_2H$
   $Si(CH_3)_2OH$, $Si(CH_3)_2(OCH_3)$
   $Si(CH_3)_2(C_nH_{2n+1})$ n = 1-20

R=Alkyl, as $C_nH_{2n+1}$, whereby n=1 to 20 is, Aryl, as Phenyl- and substituted phenyl groups, $(CH_2)_n$—$NH_2$, H R'=Alkyl, as $C_nH_{2n+1}$, whereby n=1 to 20 is, Aryl, as phenyl- and substituted phenyl groups, $(CH_2)_n$—$NH_2$, H R''=Alkyl, as $C_nH_{2n+1}$, whereby n=1 to 20 is, Aryl, as phenyl- and substituted phenyl groups, $(CH_2)_n$—$NH_2$, H R'''=Alkyl, as $C_nH_{2n+1}$, whereby n=1 to 20 is, Aryl, as phenyl- and substituted phenyl groups, $(CH_2)_n$—$NH_2$, H Preferably the silane Si 108 [$(CH_3O)_3$—Si—$C_8H_{17}$], trimethoxyoctylsilane, is used as silanising agent.

The invention also provides granules based on pyrogenically prepared silicon dioxide and having the following physicochemical properties:

| | |
|---|---|
| Average grain size: | 10 to 120 μm |
| BET surface area: | 40 to 400 $m^2/g$ |
| Pore volume: | 0.5 to 2.5 ml/g |
| Pore size distribution: | less than 5% of the total pore volume exists of pores with a diameter < 5 nm, rest meso- and macropores |
| Carbon content: | 0.3 to 15.0 wt. % |
| pH value: | 3.6 to 8.5 |
| Tapped density: | 220 to 700 g/l |

The granular material according to the invention preferably has meso- and macropores, with the volume of the mesopores constituting 10 to 80% of the total pore volume.

The carbon content of the granular material according to the invention may be from 0.3 to 15.0 wt.-%.

The particle size distribution of the granular material according to the invention may be 80 vol. % larger than 8 μm and 80 vol. % smaller than 96 μm.

In a preferred embodiment of the invention, the proportion of pores smaller than 5 pm may be at most 5% referred to the total pore volume.

The granular material according to the invention can be prepared by dispersing pyrogenically prepared silicon dioxide in water, spray drying it, heating the granules obtained at a temperature of from 150 to 1,100° C. for a period of 1 to 8 h and then silanising them. The same halosilanes, alkoxysilanes, silazanes and/or siloxanes described above can be used for the silanisation.

The invention further provides a method for the preparation of granules based on pyrogenically prepared silicon dioxide, which is characterised in that pyrogenically prepared silicon dioxide, preferably silicon dioxide prepared from silicon tetrachloride by means of flame hydrolysis, is dispersed in water, spray dried, the granules obtained are optionally heated at a temperature of from 150 to 1,100° C. for a period of 1 to 8 h and/or silanised.

The dispersion in water can have a silicon dioxide concentration of from 5 to 25 wt.-%.

The spray drying can be carried out at a temperature of from 200 to 600° C. Disc atomisers or nozzle atomisers can be used for this purpose.

The heating of the granules can be carried out both in fixed beds, for example chamber kilns, and in moving beds, for example rotary dryers.

The silanisation can be carried out using the same halosilanes, alkoxysilanes, silazanes and/or siloxanes as described above, for which the silanising agent can be optionally dissolved in an organic solvent such as, for example, ethanol.

Preferably the silane Si 108 [$(CH_3O)_3$—Si—$C_8H_{17}$], trimethoxyoctylsilane, is used as silanising agent.

The silanisation can be carried out by spraying the granular material with the silanising agent and subsequently heat-treating the mixture at a temperature of from 105 to 400° C. over a period of 1 to 6 h.

In an alternative method, the silanisation of the granules can be carried out by treating the granular material with the silanising agent in vapour form and subsequently heat-treating the mixture at a temperature of from 200 to 800° C. over a period of 0.5 to 6 h.

The heat treatment can take place under protective gas such as, for example, nitrogen.

The silanisation can be carried out continuously or batchwise in heatable mixers and dryers equipped with spraying facilities. Examples of suitable devices are ploughshare mixers, disk dryers or fluidised bed dryers.

The physicochemical variables of the granules, such as the specific surface, the particle size distribution, the pore volume, the tamped density and the silanol group concentration, the pore distribution and pH value can be altered within the specified limits by varying the starting materials and the conditions during spraying, heating and silanisation.

DETAILED DESCRIPTION OF THE INVENTION

The metal oxide or metalloid oxide to be used according to the invention can be pyrogenically produced silicon dioxide powder with
   a BET surface area of 30 to 90 $m^2/g$,
   a DBP index of 80 or less
   a mean aggregate area of less than 25000 $nm^2$,
   a mean aggregate circumference of less than 1000 nm, wherein at least 70% of the aggregates have a circumference of less than 1300 nm. This pyrogenically produced silicon dioxide is disclosed in WO 2004/054929.

The BET surface area may preferably be between 35 and 75 $m^2/g$. Particularly preferably the values may be between 40 and 60 $m^2/g$. The BET surface area is determined in accordance with DIN 66131.

The DBP index may preferably be between 60 and 80. During DBP absorption, the take-up of force, or the torque (in Nm), of the rotating blades in the DBP measuring equipment is measured while defined amounts of DBP are added, comparable to a titration. A sharply defined maximum, followed by a drop, at a specific added amount of DBP is then produced for the powder according to the invention.

A silicon dioxide powder with a BET surface area of 40 to 60 $m^2/g$ and a DBP index of 60 to 80 may be particularly preferred.

Furthermore, the silicon dioxide powder to be used according to the invention may preferably have a mean aggregate area of at most 20000 $nm^2$. Particularly preferably, the mean aggregate area may be between 15000 and 20000 $nm^2$. The aggregate area can be determined, for example, by image analysis of TEM images. An aggregate is understood to consist of primary particles of similar structure and size which have intergrown with each other, the surface area of which is less than the sum of the individual isolated primary particles. Primary particles are understood to be the particles which are initially formed in the reaction and which can grow together to form aggregates as the reaction proceeds further.

A silicon dioxide powder with a BET surface area of 40 to 60 m$^2$/g, a DBP index of 60 to 80 and a mean aggregate area between 15000 and 20000 nm$^2$ may be particularly preferred.

In a preferred embodiment, the silicon dioxide powder to be used according to the invention may have a mean aggregate circumference of less than 1000 nm. Particularly preferably, the mean aggregate circumference may be between 600 and 1000 nm. The aggregate circumference can also be determined by image analysis of TEM images.

A silicon dioxide powder with a BET surface area of 40 to 60 m$^2$/g, a DBP index of 60 to 80, a mean aggregate area between 15000 and 20000 nm$^2$ and a mean aggregate circumference between 600 and 1000 nm may be particularly preferred.

Furthermore, it may be preferable for at least 80%, particularly preferably at least 90%, of the aggregates to have a circumference of less than 1300 nm.

In a preferred embodiment, the silicon dioxide powder to be used according to the invention may assume a degree of filling in an aqueous dispersion of up to 90 wt. %. The range between 60 and 80 wt. % may be particularly preferred.

Determination of the maximum degree of filling in an aqueous dispersion is performed by the incorporation of powder, in portions, into water using a dissolver, without the addition of other additives. The maximum degree of filling is achieved when either no further powder is taken up into the dispersion, despite elevated stirring power, i.e. the powder remains in dry form on the surface of the dispersion, or the dispersion becomes solid or the dispersion starts to form lumps.

Furthermore, the silicon dioxide powder to be used according to the invention may have a viscosity at a temperature of 23° C., with respect to a 30 wt. % aqueous dispersion at a rate of shear of 5 rpm, of less than 100 mPas. In particularly preferred embodiments, the viscosity may be less than 50 mPas.

The pH of the silicon dioxide powder to be used according to the invention may be between 3.8 and 5, measured in a 4% aqueous dispersion.

The process for preparing the silicon dioxide powder to be used according to the invention, is characterised in that at least one silicon compound in the vapour form, a free-oxygen-containing gas and a combustible gas are mixed in a burner of known construction, this gas mixture is ignited at the mouth of the burner and is burnt in the flame tube of the burner, the solid obtained is separated from the gas mixture and optionally purified, wherein
  the oxygen content of the free-oxygen-containing gas is adjusted so that the lambda value is greater than or equal to 1,
  the gamma-value is between 1.2 and 1.8,
  the throughput is between 0.1 and 0.3 kg SiO$_2$/m$^3$ of core gas mixture,
  the mean normalised rate of flow of gas in the flame tube at the level of the mouth of the burner is at least 5 m/s.

The oxygen content of the free-oxygen-containing gas may correspond to that of air. That is, in this case air is used as a free-oxygen-containing gas. The oxygen content may, however also take on higher values. In a preferred manner, air enriched with oxygen should have an oxygen content of not more than 40 vol. %.

Lambda describes the ratio of oxygen supplied in the core to the stoichiometrically required amount of oxygen. In a preferred embodiment, lambda lies within the range 1<lambda<1.2.

Gamma describes the ratio of hydrogen supplied in the core to the stoichiometrically required amount of hydrogen. In a preferred embodiment, gamma lies within the range 1.6<gamma<1.8.

The normalised rate of flow of gas refers to the rate of flow at 273 K and 1 atm.

A burner of known construction is understood to be a burner with concentric tubes. The core gases are passed through the inner tube, the core. At the end of the tube, the mouth of the burner, the gases are ignited. The inner tube is surrounded by at least one other tube, the sleeve. The reaction chamber, called the flame tube, starts at the level of the mouth of the burner. This is generally a conical tube, cooled with water, which may optionally be supplied with other gases (sleeve gases) such as hydrogen or air.

The mean, normalised rate of flow of the gas in the flame tube at the level of the mouth of the burner of at least 5 m/s refers to the rate of flow immediately after the reaction mixture leaves the burner. The rate of flow is determined by means of the volume flow of the reaction products in vapour form and the geometry of the flame tube.

The core gases are understood to be the gases and vapours supplied to the burner, that is the free-oxygen-containing gas, generally air or air enriched with oxygen, the combustible gas, generally hydrogen, methane or natural gas, and the silicon compound or compounds in vapour form.

An essential feature of the process is that the mean normalised rate of flow of gas in the flame tube at the level of the mouth of the burner is at least 5 m/s. In a preferred embodiment, the mean normalised rate of flow of the gas in the flame tube at the level of the mouth of the burner assumes values of more than 8 m/s.

The mean rate of discharge of the gas mixture (feedstocks) at the mouth of the burner is not limited. However, it has proven to be advantageous when the rate of discharge at the mouth of the burner is at least 30 m/s.

In a preferred embodiment, additional air (secondary air) may be introduced into the reaction chamber, wherein the rate of flow in the reaction chamber may be raised further.

In a preferred embodiment, the mean normalised rate of flow of gas in the flame tube at the level of the mouth of the burner may be 8 to 12 m/s.

The type of silicon compound used in the process is not further restricted. Silicon tetrachloride and/or at least one organochlorosilicon compound may preferably be used.

A particularly preferred embodiment of the process is one in which
  silicon tetrachloride is used,
  the lambda value is such that 1<lambda<1.2,
  the gamma-value is between 1.6 and 1.8,
  the throughput is between 0.1 and 0.3 kg SiO$_2$/m$^3$ of core gas mixture,
  in addition at least double the amount of air, with respect to the amount of free-oxygen-containing gas introduced into the burner, is introduced into the flame tube and
  the rate of flow of the gas of feedstocks at the mouth of the burner is 40 to 65 m/s (with respect to standard conditions)
  and the mean normalised rate of flow of gas in the flame tube at the level of the mouth of the burner is between 8 and 12 m/s.

In general during the preparation of pyrogenic oxides, the rate of flow of gas in the water-cooled reaction chamber (flame tube) and in the subsequent cooling unit (cooling stretch) is adjusted in such a way that the best possible cooling power, that is to say rapid cooling of the reaction products, is ensured. In principle, it is true that the cooling power increases with decreasing rate of flow of gas. The lower limit is simply based on the requirement of still being able to transport the product through the pipes with the gas stream.

It was demonstrated that although a considerable increase in the rate of flow of gas in the reaction chamber resulted in a reduced cooling power, it led to a powder with unexpected properties. Whereas physical characteristics such as BET surface area and DBP absorption are substantially unchanged as compared with powders according to the prior art, the powder exhibits a much lower structure.

Furtheron the metal oxide or metalloid oxide to be used according to the invention can be pyrogenically produced silicon dioxide which is characterised by a metals content of less than 9 ppm.

In a preferred embodiment the high-purity pyrogenically prepared silicon dioxide to be used according to the invention, can be characterised by the following metal contents:

| | |
|---|---|
| Li | ppb <= 10 |
| Na | ppb <= 80 |
| K | ppb <= 80 |
| Mg | ppb <= 20 |
| Ca | ppb <= 300 |
| Fe | ppb <= 800 |
| Cu | ppb <= 10 |
| Ni | ppb <= 800 |
| Cr | ppb <= 250 |
| Mn | ppb <= 20 |
| Ti | ppb <= 200 |
| Al | ppb <= 600 |
| Zr | ppb <= 80 |
| V | ppb <= 5 |

The total metal content can then be 3252 ppb (~3.2 ppm) or less.

In an embodiment of the invention, which is further preferred, the high-purity pyrogenically prepared silicon dioxide can be characterised by the following metal contents:

| | |
|---|---|
| Li | ppb <= 1 |
| Na | ppb <= 50 |
| K | ppb <= 50 |
| Mg | ppb <= 10 |
| Ca | ppb <= 90 |
| Fe | ppb <= 200 |
| Cu | ppb <= 3 |
| Ni | ppb <= 80 |
| Cr | ppb <= 40 |
| Mn | ppb <= 5 |
| Ti | ppb <= 150 |
| Al | ppb <= 350 |
| Zr | ppb <= 3 |
| V | ppb <= 1 |

The total metal content can then be 1033 ppb (~1.03 ppm) or less.

The process for the preparation of the high-purity pyrogenically prepared silicon dioxide is characterised in that silicon tetrachloride is in known manner reacted in a flame by means of high-temperature hydrolysis to give silicon dioxide, and a silicon tetrachloride is used here which has a metal content of less than 30 ppb.

In a preferred embodiment of the invention a silicon tetrachloride can be used which has the following metal contents in addition to silicon tetrachloride:

| | |
|---|---|
| Al | less than 1 ppb |
| B | less than 3 ppb |
| Ca | less than 5 ppb |
| Co | less than 0.1 ppb |
| Cr | less than 0.2 ppb |
| Cu | less than 0.1 ppb |
| Fe | less than 0.5 ppb |
| K | less than 1 ppb |
| Mg | less than 1 ppb |
| Mn | less than 0.1 ppb |
| Mo | less than 0.2 ppb |
| Na | less than 1 ppb |
| Ni | less than 0.2 ppb |
| Ti | less than 0.5 ppb |
| Zn | less than 1 ppb |
| Zr | less than 0.5 ppb |

Silicon tetrachloride having this low metal content can be prepared according to DE 100 30 251 or according to DE 100 30 252.

The metal content of the silicon dioxide according to the invention is within the ppm range and below (ppb range).

EXAMPLES

The BET surface area is determined in accordance with DIN 66131.

The dibutyl phthalate absorption is measured with a RHEOCORD 90 instrument made by Haake, Karlsruhe. For this purpose, 16 g of the silicon dioxide powder, weighed out to an accuracy of 0.001 g, is placed in a mixing chamber, this is sealed with a lid and dibutyl phthalate is added at a pre-set rate of addition of 0.0667 ml/s via a hole in the lid. The mixer is operated with a motor speed of 125 revs per minute. After reaching maximum torque, the mixer and DBP addition are automatically switched off. The DBP absorption is calculated from the amount of DBP consumed and the amount of particles weighed out in accordance with:

DBP index (g/100 g) =(DBP consumed in g/initial weight of particles in g)×100.

A programmable rheometer for testing complex flow behaviour, equipped with a standard rotation spindle, was available for determining the viscosity.

Rate of shear: 5 to 100 rpm

Temperature of measurement: room temperature (23° C.)

Concentration of dispersion: 30 wt. %

Procedure: 500 ml of dispersion are placed in a 600 ml glass beaker and tested at room temperature (statistical recording of temperature via a measuring sensor) under different rates of shear.

Determination of the compacted bulk density is based on DIN ISO 787/XI K 5101/18 (not sieved).

Determination of the pH is based on DIN ISO 787/IX, ASTM D 1280, JIS K 5101/24.

The image analyses were performed using a TEM instrument H 7500 made by Hitachi and a CCD camera MegaView II, made by SIS. Image magnification for evaluation purposes was 30000:1 at a pixel density of 3.2 nm. The number of particles evaluated was greater than 1000. Preparation was in accordance with ASTM 3849-89. The lower threshold limit for detection was 50 pixels.

Determining the maximum degree of filling in an aqueous dispersion: 200 g of fully deionised water were initially placed in a 1 l vessel (diameter about 11 cm). A dissolver from VMA-Getzmann, model Dispermat® CA-40-C with a dissolver disc, diameter about 65 mm, was used as the dispersing unit.

At the start, the dissolver is operated at about 650 rpm. The powder is added in portions of about 5 g. After each addition, there is a waiting period until the powder has been completely incorporated into the suspension. Then the next portion is added. As soon as incorporation of an added amount of powder takes longer than about 10 s, the speed of the dissolver disc is increased to 1100 rpm. Then further stepwise addition is performed. As soon as incorporation of an added amount of powder takes longer than about 10 s, the speed of the dissolver disc is increased to 1700 rpm.

The maximum degree of filling is achieved when either no further powder is taken up by the dispersion, despite increased stirring power, i.e. the powder remains in dry form on the surface of the dispersion, or the dispersion becomes solid or the dispersion starts to form lumps.

The amount of powder added can be determined by difference weighing (preferably difference weighing of the powder stock). The maximum degree of filling is calculated as:

Maximum degree of filling=amount of powder added [g]/(amount of powder added [g] +amount of water initially introduced [g])×100%

Example 1 (Comparison Example)

500 kg/h $SiCl_4$ are vaporised at about 90° C. and transferred to the central tube of a burner of known construction. 145 $Nm^3/h$ of hydrogen and 207 $Nm^3/h$ of air with an oxygen content of 35 vol. % are also introduced into this tube. This gas mixture is ignited and burnt in the flame tube of the water-cooled burner. The mean normalised rate of flow of gas in the flame tube at the level of the mouth of the burner is 0.7 m/s. After cooling the reaction gases, the pyrogenic silicon dioxide powder is separated from the hydrochloric acid-containing gases using a filter and/or a cyclone. The pyrogenic silicon dioxide powder is treated with water vapour and air in a deacidification unit.

Examples 2 to 4 (Comparison Examples)

are performed in the same way as example 1. The parameters which are altered each time are given in Table 1.

Example 5 (Working Example)

400 kg/h $SiCl_4$ are vaporised at about 90° C. and transferred to the central tube of a burner of known construction. 195 $Nm^3/h$ of hydrogen and 303 $Nm^3/h$ of air with an oxygen content of 30 vol. % are also introduced into this tube. This gas mixture is ignited and burnt in the flame tube of the water-cooled burner. The mean normalised rate of flow of gas in the flame tube at the level of the mouth of the burner is 10 m/s. After cooling the reaction gases, the pyrogenic silicon dioxide powder is separated from the hydrochloric acid-containing gases using a filter and/or a cyclone. The pyrogenic silicon dioxide powder is treated with water vapour and air in a deacidification unit.

Examples 6 to 8 are performed in the same way as described in example 1. The parameters which are altered each time are given in Table 1.

The analytical data for powders 1 to 8 are given in Table 2.

The powders in examples 5 to 8 exhibit much lower values for mean aggregate area, mean aggregate circumference and maximum and minimum aggregate diameter and thus much less structure than the powders in comparison examples 1 to 4.

The powders have a much higher maximum degree of filling and a much lower viscosity in an aqueous dispersion.

TABLE 1

Experimental conditions and the flame parameters calculated therefrom

| | | Comparison examples | | | | Examples | | | |
| | | Example | | | | | | | |
| | | 1 | 2 | 3 | 4 | 5 | 6 | 7 | 8 |
|---|---|---|---|---|---|---|---|---|---|
| $SiCl_4$ | kg/h | 500 | 500 | 400 | 400 | 400 | 400 | 350 | 400 |
| $H_2$ core | $Nm^3/h$ | 145 | 210 | 255 | 190 | 195 | 195 | 145 | 195 |
| Air (primary air) | $Nm^3/h$ | 207 | 300 | 250 | 320 | 303 | 300 | 220 | 300 |
| $O_2$ content of air | Vol. % | 35 | 35 | 35 | 30 | 35 | 29.5 | 35 | 33 |
| Secondary air[b] | $Nm^3/h$ | — | 50 | 250 | 50 | 730 | 600 | 500 | 100 |
| Burner diameter | mm | 55 | 65 | 65 | 65 | 64 | 64 | 64 | 64 |
| Flame tube diameter | mm | 450 | 450 | 450 | 450 | 208 | 208 | 160 | 160 |
| lambda[c] | | 1.0 | 1.0 | 0.69 | 1.0 | 1.1 | 1.0 | 1.1 | 1.0 |
| gamma | | 1.1 | 1.6 | 2.4 | 1.8 | 1.8 | 1.8 | 1.6 | 1.8 |
| $V_B$[d] | m/s | 49 | 48 | 47 | 47 | 47 | 47 | 36 | 47 |
| $V_F$[e] | m/s | 0.7 | 1 | 1.28 | 1 | 10 | 9 | 12 | 8 |
| Throughput[a] | $kg/m^3$ | 0.42 | 0.31 | 0.25 | 0.25 | 0.26 | 0.26 | 0.3 | 0.26 |

[a] kg $SiO_2/m^3$ of primary air + hydrogen + $SiCl_4$ (feedstocks);
[b] air with 21 vol. % $O_2$;
[c] with reference to primary air;
[d] $V_B$ = mean rate of discharge at the mouth of the burner (normalised);
[e] $V_F$ = mean rate of flow in the reaction chamber at the level of the mouth of the burner (normalised).

TABLE 2

Analytical data for silicon dioxide powders

| | | Comparison examples Example | | | | Examples | | | |
|---|---|---|---|---|---|---|---|---|---|
| | | 1 | 2 | 3 | 4 | 5 | 6 | 7 | 8 |
| BET | m²/g | 44 | 55 | 49 | 60 | 45 | 44 | 60 | 55 |
| DBP | g/100 g | 106 | 121 | 142 | 90 | 67 | 72 | 61 | 65 |
| Mean aggregate area | nm² | 23217 | 22039 | 24896 | 22317 | 17063 | 15972 | 16816 | 18112 |
| Mean aggregate circumference | nm | 1032 | 1132 | 1201 | 1156 | 742 | 658 | 704 | 699 |
| Aggregates < 1300 nm | % | 61 | 64 | 52 | 64 | 80 | 84 | 89 | 82 |
| Max. aggregate diameter | nm | 292 | (b) | (b) | (b) | 191 | 183 | (b) | (b) |
| Min. aggregate diameter | nm | 207 | (b) | (b) | (b) | 123 | 117 | (b) | (b) |
| Compacted bulk density | g/l | 112 | 90 | 89 | 117 | 117 | 105 | 110 | 123 |
| Viscosity(a) | mPas | 420 | 600 | 1200 | 380 | 20 | 33 | 48 | 18 |
| Maximum degree of filling | wt. % | 34 | 25 | 26 | 33 | 72 | 81 | 79 | 81 |
| pH | | 4.5 | 4.8 | 4.7 | 4.6 | 4.7 | 4.8 | 4.5 | 4.8 |

(a)30 wt. % dispersion at 5 rpm;
(b)not determined

Example 9 (Comparison Example)

500 kg/h SiCl$_4$ having a composition in accordance with Table 3 are evaporated at approx. 90° C. and transferred into the central tube of a burner of known design. 190 Nm³/h hydrogen as well as 326 Nm³/h air having a 35 vol. % oxygen content are introduced additionally into this tube. This gas mixture is ignited and burns in the flame tube of the water-cooled burner. 15 Nm³/h hydrogen are introduced additionally into a jacket nozzle surrounding the central nozzle, in order to prevent baking-on. 250 Nm³/h air of normal composition are moreover introduced additionally into the flame tube. After cooling of the reaction gases the pyrogenic silicon dioxide powder is separated by means of a filter and/or a cyclone from the hydrochloric acid-containing gases. The pyrogenic silicon dioxide powder is treated with water vapour and air in a deacidifying unit in order to remove adherent hydrochloric acid. The metal contents are reproduced in Table 5.

Example 10 (Embodiment Example)

500 kg/h SiCl$_4$ having a composition in accordance with Table 4 are evaporated at approx. 90° C. and transferred into the central tube of a burner of known design. 190 Nm³/h hydrogen as well as 326 Nm³/h air having a 35 vol. % oxygen content are introduced additionally into this tube. This gas mixture is ignited and burns in the flame tube of the water-cooled burner. 15 Nm³/h hydrogen are introduced additionally into a jacket nozzle surrounding the central nozzle, in order to prevent baking-on. 250 Nm³/h air of normal composition are moreover introduced additionally into the flame tube. After cooling of the reaction gases the pyrogenic silicon dioxide powder is separated by means of a filter and/or a cyclone from the hydrochloric acid-containing gases. The pyrogenic silicon dioxide powder is treated with water vapour and air in a deacidifying unit in order to remove adhering hydrochloric acid. The metal contents are reproduced in Table 5.

TABLE 3

Composition of SiCl$_4$, Example 9

| Al ppb | B ppb | Ca ppb | Co ppb | Cr ppb | Cu ppb | Fe ppb | K ppb | Mg ppb | Mn ppb | Mo ppb | Na ppb | Ni ppb | Ti ppb | Zn ppb | Zr ppb |
|---|---|---|---|---|---|---|---|---|---|---|---|---|---|---|---|
| 18 | 140 | 86 | <0.1 | 2.7 | 0.4 | 280 | 14 | — | 1.4 | — | 200 | 0.6 | 250 | | |

TABLE 4

Composition of SiCl$_4$, Example 10

| Al ppb | B ppb | Ca ppb | Co ppb | Cr ppb | Cu ppb | Fe ppb | K ppb | Mg ppb | Mn ppb | Mo ppb | Na ppb | Ni ppb | Ti ppb | Zn ppb | Zr ppb |
|---|---|---|---|---|---|---|---|---|---|---|---|---|---|---|---|
| <1 | <30 | <5 | <0.1 | <0.2 | <0.1 | <0.5 | <1 | <1 | <0.1 | <0.2 | <1 | <0.2 | <0.5 | <1 | <0.5 |

TABLE 5

Metal contents of silicon dioxides (ppb)

| [ppb] | Example 10a | | Example 10b | | Example 9 Comparison Example Aerosil ® OX50 |
|---|---|---|---|---|---|
| Li | 0.8 | <=10 | 0.5 | <=1 | <100 |
| Na | 68 | <=80 | 49 | <=50 | <1000 |
| K | 44 | <=80 | 46 | <=50 | 10 |
| Mg | 10 | <=20 | 10 | <=10 | <200 |
| Ca | 165 | <=300 | 89 | <=90 | 190 |
| Fe | 147 | <=800 | 192 | <=200 | <100 |
| Cu | 3 | <=10 | <3 | <=3 | <100 |
| Ni | 113 | <=800 | 79 | <=80 | <200 |
| Cr | 47 | <=250 | 37 | <=40 | <100 |
| Mn | 3 | <=20 | 2 | <=5 | <100 |
| Ti | 132 | <=200 | 103 | <=150 | 5600 |
| Al | 521 | <=600 | 350 | <=350 | 780 |
| Zr | 3 | <=80 | <3 | <=3 | <100 |
| V | 0.5 | <=5 | <0.5 | <=1 | <500 |
|  | Σ 1257 ppb = 1.26 ppm | Σ 3255 ppb = 3.2 ppm | Σ 964 ppb = 0.96 ppm | Σ 1033 ppb = 1.03 ppm | Σ 9080 ppb = 9.08 ppm |

Measuring Method

The pyrogenically prepared silicon dioxides which are obtained are analysed as to their metal content. The samples are dissolved in an acid solution which comprises predominantly HF.

The $SiO_2$ reacts with the HF, forming $SiF_4 + H_2O$. The $SiF_4$ evaporates, leaving behind completely in the acid the metals which are to be determined. The individual samples are diluted with distilled water and analysed against an internal standard by inductively coupled plasma-atomic emission spectroscopy (ICP-AES) in a Perkin Elmer Optima 3000 DV. The imprecision of the values is the result of sample variations, spectral interferences and the limitations of the measuring method. Larger elements have a relative imprecision of ±5%, while the smaller elements have a relative imprecision of ±15%.

The pyrogenically prepared silicon dioxides used are silicon dioxides having the physicochemical properties given below.

To prepare the silicon dioxides, a liquid silicon compound is sprayed into an oxyhydrogen flame consisting of hydrogen and air. In most cases silicon tetrachloride is used. This substance is hydrolysed to silicon dioxide and hydrochloric acid by the action of the water formed during the hydrogen-oxygen reaction. After leaving the flame, the silicon dioxide enters a so-called coagulation zone, wherein the primary Aerosil particles and primary Aerosil aggregates agglomerate. The product, which exists at this stage as a kind of aerosol, is separated from the accompanying gaseous substances in cyclones and then aftertreated with moist heated air.

By this process the residual hydrochloric acid content can be lowered to 0.025%. As the silicon dioxide obtained at the end of this process has a bulk density of only about 15 g/l, there is a subsequent vacuum compaction, whereby tamped densities of about 50 g/l and more can be established.

The particle sizes of the silicon dioxides can be varied by means of the reaction conditions such as, for example, flame temperature, proportions of hydrogen and oxygen, quantity of silicon tetrachloride, residence time in the flame or length of the coagulation path.

The BET surface area is determined using nitrogen in accordance with DIN 66 131.

The pore volume is calculated from the sum of the micro-, meso- and macropore volumes. The micro- and mesopores are determined by recording an $N_2$ isotherm and evaluation thereof by the methods of BET, de Boer and Barrett, Joyner and Halenda. The macropores D>30 nm are determined by the Hg porosimetry method. For the determination of the macropores, the sample is dried for 15 h at 100° C. in the drying oven and degassed at room temperature in a vacuum.

For the determination of the micro- and mesopores, the sample is dried for 15 h at 100° C. in the drying oven and degassed for 1 h at 200° C. in a vacuum.

The silanol group concentration is determined by the lithium alanate method. Here the SiOH-groups are reacted with LiAlH4 and the quantity of hydrogen formed during this reaction is determined from the pressure.

Principle of Measurement

The granular material is weighed into a four-necked flask. The flask is evacuated and an oil bath is heated to 150° C. The temperature in the flask (controlled by an internal thermometer) rises with the temperature of the oil bath to about 130° C. The pressure during the preliminary treatment is recorded using a pressure measuring device $PI_2$ (TM 210, from Leybold, measuring range $10^3$ to $10^{-3}$ mbar). The desorption of the water can be monitored from the pressure measurement. At the end of the preliminary treatment (30 min at the end temperature) a pressure of less than $10^{-2}$ mbar must have been achieved.

After completion of the preliminary treatment, the evacuated flask is separated from the vacuum unit by closing the stop valve and is brought to normal temperature. The actual measurement is based on a measured quantity of $LiAlH_4$ solution being introduced into the flask through the dropping funnel and the rise in pressure being measured from the hydrogen formed. If the volume of the flask is known, the quantity of $H_2$ can be calculated from the ideal gas law. The pressure is recorded using a digital measuring device ($PI_1$) (MKS Instruments PR-2000), having a measuring range of between 0 and 1 bar.

The $LiAlH_4$ solution used (2% $LiALH_4$ in diethylene glycol dimethyl ether) is degassed prior to the experiment being carried out, in order to remove readily volatile constituents, which distort the pressure measurement. For this purpose the pressure above the solution in the dropping funnel is lowered by a second vacuum pump to the vapour pressure (3.7 mbar at 22° C.), so that the liquid boils. A blank measurement without a sample is taken to test whether the solution is sufficiently degassed. In the determination of the hydrogen pressure, a correction is made using the vapour pressure of the solvent.

Interpretation

The apparatus is calibrated by first of all determining the volume of the dropping funnel provided with a ground-glass stopper, gauging the capacity in litres. The volume of the reaction flask inclusive of all connections as far as the stop valve is obtained by the following experiment:

The dropping funnel, filled with air at atmospheric pressure, is attached to the evacuated flask. A pressure compensation between the two volumes is then brought about by opening the tap of the dropping funnel. The pressure established is indicated by the digital measuring device. The volume of the reaction vessel is obtained from the mass balance. A volume $V_R$ equal to 243.8 ml is obtained with the present arrangement.

The number of moles of hydrogen formed is obtained from the equations:

$$n = \frac{p \cdot V(\text{corr.})}{RT}$$

$$V_{corr.} = V_R - V_{solids} - V_{solution}$$

p is the increase in pressure in the reaction flask. This value is corrected by an amount corresponding to the vapour pressure of the solvent (3.7 mbar at 22° C.). At room temperatures greatly differing from 22° C. the vapour pressure is taken from the vapour pressure table. It is useful so to select the weighed sample, that a value for p of between 200 and 800 mbar is obtained. In this case minor changes in the vapour pressure owing to temperature variations have hardly any effect on the result.

The volume of the reaction vessel is corrected by deducting the volume of solid matter and the volume of the solution introduced. The former is given from the weighed portion and the density and the latter is read from the dropping funnel.

The density of silanol groups is finally obtained from the equation:

$$d = \frac{n \cdot N_L}{F}$$

$N_L$: Lohschmidt number
F: Surface of the weighed solid matter

The samples are treated as follows:

1 h heating at 120° C. and 0.2 mbar; cooling to 60° C.; addition of $LiAlH_4$; after 10 mins, reading the pressure difference which has arisen.

The particle size distribution is determined by means of the laser optical particle size analyser Cilas Granulametre 715.

The tapped volume is determined in accordance with ASTM D 4164-88.

Equipment: Tapping volumeter STA V 2003 from Engelsmann, in accordance with DIN 53194, section 5.2. b-f
Measuring cylinder 250 ml, graduation marks every 2 ml
Balance with limit of error of max. ±0.1 g Procedure The counter of the tapping volumometer is set to 1000 strokes.

The measuring cylinder is tared.
The granular material is placed in the measuring cylinder up to the 250 ml mark.
The weight of the sample is recorded (±0.1 g).
The measuring cylinder is placed in the volumeter and the apparatus is switched on.
End of tapping: the apparatus automatically switches off after 1000 strokes
The tapped bulk volumes are read to an accuracy of 1 ml.

Calculation
E: weighed portion of granular material in g
V: volume read in ml
W: water content in wt. % (determined in accordance with Specification P001)

$$\text{Tapped density} = \frac{E \times (100 - W)}{V \times 100}$$

The pH value is determined in 4% aqueous dispersion, in the case of hydrophobic catalyst supports in water:ethanol 1:1.

Preparation of the Granules According to the Invention

The pyrogenically prepared silicon dioxide is dispersed in completely demineralised water. A dispersing aggregate which operates according to the rotor/stator principle is used in the process. The suspensions formed are spray dried. The finished product is precipitated by a filter or cyclone.

The sprayed granules are heated in a muffle furnace.

The spray-dried and optionally heated granules are placed in a mixer for the silanisation process and sprayed with intensive mixing optionally first of all with water and then with the silane Si 108 (trimethoxyoctylsilane) or HMDS (hexamethyldisilazane). After spraying has been completed, the material is mixed for 15 to 30 more minutes and then heated for 1 to 4 h at 100 to 400° C.

The water used can be acidified with an acid, for example, hydrochloric acid, to a pH value of 7 to 1. The silanising agent used can be dissolved in a solvent such as, for example, ethanol.

The invention claimed is:

1. Granules based on pyrogenically prepared silicon dioxide and having the following physicochemical properties:

| | |
|---|---|
| Average grain size: | 10 to 120 μm |
| BET surface area: | 40 to 400 m²/g |
| Pore volume: | 0.5 to 2.5 ml/g |
| Pore size distributions: | less than 5% of the total pore volume exists of pores with a diameter < 5 nm, rest meso- and macropores |
| pH value: | 3.6 to 8.5 |
| Tapped density: | 220 to 700 g/l, | obtained by a process in which pyrogenically prepared silicon dioxide is dispersed in water and spray dried, the granules obtained are optionally heated at a temperature of from 150 to 1,100° C. for a period of 1 to 8 h and/or silanised, wherein the pyrogenically prepared silicon dioxide is prepared from silicon tetrachloride by means of flame hydrolysis and is a high-purity pyrogenic silicon dioxide powder having a metal content of less than 9 ppm with
  a BET surface area of 30 to 90 m²/g,
  a DBP index of 80 or less
  a mean aggregate area of less than 25000 nm², a mean aggregate circumference of less than 1000 nm, wherein at least 70% of the aggregates have a circumference of less than 1300 nm.

2. A method for the preparation of granules based on pyrogenically prepared silicon dioxide as defined in claim 1, comprising dispersing pyrogenically prepared silicon dioxide in water to form a dispersion, spray drying the dispersion, obtaining granules, optionally heating the granules at a temperature of from 150 to 1,100° C. for a period of 1 to 8 h and/or silanizing the granules wherein as pyrogenically prepared silicon dioxide a high-purity pyrogenic silicon dioxide powder having a metal content of less than 9 ppm with a BET surface area of 30 to 90 m$^2$/g, a DBP index of 80 or less a mean aggregate area of less than 25000 nm$^2$, a mean aggregate circumference of less than 1000 nm, wherein at least 70% of the aggregates have a circumference of less than 1300 nm is used.

3. The method according to claim 2, wherein the granules obtained are heated at a temperature of from 150 to 1,100° C. for a period of 1 to 8 h.

4. The method according to claim 2, wherein the obtained granules are silanized.

5. The method according to claim 2, wherein the obtained granules are heated at a temperature of from 150 to 1,100° C. for a period of 1 to 8 h and subsequently silanised.

\* \* \* \* \*